US010042678B2

(12) United States Patent
Huang et al.

(10) Patent No.: US 10,042,678 B2
(45) Date of Patent: Aug. 7, 2018

(54) LOCK MANAGEMENT METHOD AND SYSTEM, METHOD AND APPARATUS FOR CONFIGURING LOCK MANAGEMENT SYSTEM

(71) Applicant: Huawei Technologies Co., Ltd., Shenzhen, Guangdong (CN)

(72) Inventors: Wenlong Huang, Shenzhen (CN); Haoyang Che, Shenzhen (CN); Chuanting Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 242 days.

(21) Appl. No.: 14/995,789

(22) Filed: Jan. 14, 2016

(65) Prior Publication Data

US 2016/0132364 A1  May 12, 2016

Related U.S. Application Data

(63) Continuation of application No. PCT/CN2014/080679, filed on Jun. 25, 2014.

(30) Foreign Application Priority Data

Dec. 30, 2013 (CN) .......................... 2013 1 0746990

(51) Int. Cl.
*G06F 13/00* (2006.01)
*G06F 12/14* (2006.01)
(Continued)

(52) U.S. Cl.
CPC ................ *G06F 9/526* (2013.01); *G06F 9/46* (2013.01); *G06F 9/466* (2013.01); *G06F 9/50* (2013.01); *G06F 17/30362* (2013.01)

(58) Field of Classification Search
None
See application file for complete search history.

(56) References Cited

U.S. PATENT DOCUMENTS 5,596,754 A * 1/1997 Lomet ..................... G06F 9/526
                                                                707/E17.007
5,699,500 A * 12/1997 Dasgupta .................. G06F 9/52
                                                                714/1
(Continued)

FOREIGN PATENT DOCUMENTS

CN          103036717 A      4/2013
CN          103064898 A      4/2013
(Continued)

*Primary Examiner* — Michael Sun (57) ABSTRACT

A lock management method and system, and a method and an apparatus for configuring a lock management system is provided. A corresponding level of a lock management system is set for each service execution node according to the number of service execution nodes included in a distributed system, the number of system instances on all service execution nodes, the number of handling processes on all the service execution nodes, and a delay of access of each service execution node to a central control node of the distributed system. At least one lock manager is allocated to each service execution node separately according to the level, which is corresponding to each service execution node, of the lock management system. A lock level context is configured for each lock manager, where the lock level context is used to determine an adjacent lock manager of each lock manager.

18 Claims, 5 Drawing Sheets

(51) Int. Cl.
*G06F 9/52* (2006.01)
*G06F 9/46* (2006.01)
*G06F 9/50* (2006.01)
*G06F 17/30* (2006.01)

(56) References Cited

U.S. PATENT DOCUMENTS

| | | | | |
|---|---|---|---|---|
| 5,933,824 | A * | 8/1999 | DeKoning | G06F 9/52 |
| 7,739,245 | B1 * | 6/2010 | Agarwal | G06F 9/526 |
| | | | | 707/687 |
| 7,870,111 | B2 * | 1/2011 | Walker | G06F 9/466 |
| | | | | 707/704 |
| 8,086,579 | B1 * | 12/2011 | Chandrasekaran | |
| | | | | G06F 17/30362 |
| | | | | 707/689 |
| 2004/0019892 | A1 * | 1/2004 | E. | G06F 9/52 |
| | | | | 718/107 |
| 2004/0225742 | A1 * | 11/2004 | Loaiza | G06F 9/526 |
| | | | | 709/229 |
| 2012/0066191 | A1 * | 3/2012 | Chang | G06F 17/30171 |
| | | | | 707/704 |
| 2012/0089735 | A1 * | 4/2012 | Attaluri | G06F 9/526 |
| | | | | 709/226 |
| 2012/0137075 | A1 * | 5/2012 | Vorbach | G06F 9/526 |
| | | | | 711/122 |
| 2015/0356110 | A1 * | 12/2015 | Lin | G06F 17/30171 |
| | | | | 707/704 |
| 2016/0004718 | A1 * | 1/2016 | Lin | G06F 17/30171 |
| | | | | 707/690 |

FOREIGN PATENT DOCUMENTS

CN 103744719 A 4/2014
WO WO 2012/166865 A2 12/2012

\* cited by examiner

LOCK MANAGEMENT METHOD AND SYSTEM, METHOD AND APPARATUS FOR CONFIGURING LOCK MANAGEMENT SYSTEM

CROSS-REFERENCE TO RELATED APPLICATIONS

This application is a continuation of International Application No. PCT/CN2014/080679, filed on Jun. 25, 2014, which claims priority to Chinese Patent Application No. 201310746990.9, filed on Dec. 30, 2013, both of which are hereby incorporated by reference in their entireties.

TECHNICAL FIELD

The present invention relates to the computer field, and in particular, to a lock management method and system, and a method and an apparatus for configuring a lock management system.

BACKGROUND

In a distributed system, data is shared by processes distributed to multiple service execution nodes. If a process needs to perform an operation on any resource, the process needs to obtain a lock in advance. Control of concurrent access of different processes is implemented by a global lock manager, and the global lock manager records a situation of accessing a resource and holding a lock by each process, and maintains a lock request waiting queue. When receiving a lock request, the global lock manager determines, according to a lock type, lock compatibility, and a state of whether a lock is held, whether to satisfy the lock request.

In an existing lock management system, a collaboration technology of a global lock manager and a node lock manager is adopted. In a service execution node, each system instance has a node lock manager, and a process managed by each system instance shares a lock manager. After a process corresponding to a system instance has a lock request, the lock request is first sent to a node lock manager; and if the node lock manager can handle the lock request, the node lock manager returns a lock to the process that requests the lock, and if the node lock manager cannot handle the lock request, the node lock manager sends the lock request to a global lock manager, and the global lock manager handles the lock request.

In a process of implementing the foregoing lock management system, the number of levels of the lock management system in the lock management system in the prior art is determined during program development. When a large number of lock access requests occur in the system, a lock access delay is relatively high, and system running performance cannot be ensured.

SUMMARY

Embodiments of the present invention provide a lock management method and system, and a method and an apparatus for configuring a lock management system, which can reduce a lock access delay and improve system running performance.

To achieve the foregoing objective, the following technical solutions are used in the embodiments of the present invention:

According to a first aspect, a method for configuring a lock management system in a distributed system is provided, including:

setting a corresponding level of a lock management system for each service execution node according to the number of service execution nodes included in the distributed system, the number of system instances on all service execution nodes, the number of handling processes on all the service execution nodes, and a delay of access of each service execution node to a central control node of the distributed system;

allocating at least one lock manager to each service execution node separately according to the level, which is corresponding to each service execution node, of the lock management system; and configuring a lock level context for each lock manager, where the lock level context is used to determine an adjacent lock manager of each lock manager.

With reference to the first aspect, in a first possible implementation manner, the allocating at least one lock manager to each service execution node separately according to the level, which is corresponding to each service execution node, of the lock management system specifically includes:

when a lock management system set for a service execution node has two levels, allocating one node lock manager and one global lock manager to the service execution node, where an upper-level lock manager of the node lock manager is the global lock manager; and when the level, which is set for the service execution node, of the lock management system is greater than two, allocating one node lock manager, one global lock manager, and at least one local lock manager that is set between the node lock manager and the global lock manager to the service execution node, and determining an upper-level lock manager and a lower-level lock manager of each local lock manager according to the lock level context, where a lower-level lock manager requests a lock from an upper-level lock manager.

With reference to the first possible implementation manner of the first aspect, in a second possible implementation manner, after the allocating at least one lock manager to each service execution node according to the level, which is corresponding to each service execution node, of the lock management system, the method further includes:

when a service execution node corresponding to the global lock manager is different from a service execution node on which at least one system instance is located, setting a lock manager at one level for the service execution node corresponding to the at least one system instance.

With reference to the first aspect or any possible implementation manner of the first aspect, in a third possible implementation manner, the lock management context includes: the number of lock levels, a level at which a lock manager is located, an upper-level lock manager, a lower-level lock manager, and a service execution node for which a lock manager is responsible.

According to a second aspect, a lock management method is provided, including:

receiving, by using a node lock manager allocated to a service execution node, a lock request sent by the service execution node, and according to a state of whether a lock is held by the node lock manager, continuing to send the lock request to an upper-level lock manager, or returning a lock corresponding to the lock request to the service execution node;

receiving the lock request by using the upper-level lock manager of the node lock manager, and according to a state of whether a lock is held, continuing to send the lock request to a more upper-level lock manager, or returning the lock corresponding to the lock request to the node lock manager; and according to a set level of a lock management system, handling the lock request by using each upper-level lock manager of the node lock manager sequentially according to a state of whether a lock is held at each level, until the lock request is sent to the global lock manager, and returning, by using the global lock manager, the lock corresponding to the lock request to a lower-level lock manager of the global lock manager, until the lock corresponding to the lock request is returned to the service execution node.

With reference to the second aspect, in a first possible implementation manner, the according to a state of whether a lock is held by the node lock manager, continuing to send the lock request to an upper-level lock manager, or returning a lock corresponding to the lock request to the service execution node specifically includes:

when the node lock manager holds the lock corresponding to the lock request, returning the lock corresponding to the lock request to the service execution node by using the node lock manager; and when the node lock manager does not hold the lock corresponding to the lock request, sending the lock request to the upper-level lock manager of the node lock manager by using the node lock manager.

With reference to the second aspect, in a second possible implementation manner, the according to a state of whether a lock is held, continuing to send the lock request to a more upper-level lock manager, or returning the lock corresponding to the lock request to the node lock manager specifically includes:

when the upper-level lock manager of the node lock manager holds the lock corresponding to the lock request, returning the lock corresponding to the lock request to the node lock manager by using the upper-level lock manager of the node lock manager; and when the upper-level lock manager of the node lock manager does not hold the lock corresponding to the lock request, sending the lock request to the more upper-level lock manager by using the upper-level lock manager of the node lock manager.

With reference to the second aspect, the first possible implementation manner, or the second possible implementation manner, in a third possible implementation manner, the method further includes:

combining, by using the lock manager, a preset number of lock requests that need to be sent to the upper-level lock manager into a same lock request, and sending the same lock request to the upper-level lock manager of the lock manager.

With reference to the second aspect, the first possible implementation manner, or the second possible implementation manner, in a fourth possible implementation manner, the method further includes:

when the lock corresponding to the lock request is being returned, setting, by using the lock manager, a maximum holding time of the lock corresponding to the lock request, and when a time of holding the lock, which is corresponding to the lock request, by the lower-level lock manager of the lock manager is greater than or equal to the maximum holding time, sending a forced invalidation request to the lower-level lock manager of the lock manager by using the lock manager, so that after receiving the forced invalidation request, the lower-level lock manager of the lock manager releases the lock corresponding to the lock request.

According to a third aspect, an apparatus for configuring a lock management system is provided and is applied to a distributed system, and the apparatus includes an acquiring unit, an allocating unit, and a configuring unit, where:

the acquiring unit is configured to set a corresponding level of a lock management system for each service execution node according to the number of service execution nodes included in the distributed system, the number of system instances on all service execution nodes, the number of handling processes on all the service execution nodes, and a delay of access of each service execution node to a central control node of the distributed system;

the allocating unit is configured to allocate at least one lock manager to each service execution node separately according to the level, which is acquired by the acquiring unit and is corresponding to each service execution node, of the lock management system; and the configuring unit is configured to configure a lock level context for each lock manager allocated by the allocating unit, where the lock level context is used to determine an adjacent lock manager of each lock manager.

With reference to the third aspect, in a first possible implementation manner, when a lock manager set for a service execution node has two levels, the allocating unit is specifically configured to allocate one node lock manager and one global lock manager to the service execution node, where an upper-level lock manager of the node lock manager is the global lock manager;

or, when a level, which is set for a service execution node, of a lock management system is greater than two, the allocating unit is specifically configured to: allocate one node lock manager, one global lock manager, and at least one local lock manager that is set between the node lock manager and the global lock manager to the service execution node, and determine an upper-level lock manager and a lower-level lock manager of each local lock manager according to the lock level context, where a lower-level lock manager requests a lock from an upper-level lock manager.

With reference to the first possible implementation manner of the third aspect, in a second possible implementation manner, the allocating unit is further configured to: when a service execution node corresponding to the global lock manager is different from a service execution node on which at least one system instance is located, set a lock manager at one level for the service execution node corresponding to the at least one system instance.

With reference to the third aspect or any possible implementation manner of the third aspect, in a third possible implementation manner, the lock management context includes: the number of lock levels, a level at which a lock manager is located, an upper-level lock manager, a lower-level lock manager, and a service execution node for which a lock manager is responsible.

According to a fourth aspect, a lock management system is provided, including at least one node lock manager, a local lock manager, and a global lock manager, where the number of lock managers set for each service execution node is corresponding to the number of levels of the lock management system;

the node lock manager is configured to: receive a lock request sent by the service execution node, and according to a state of whether a lock is held, continue to send the lock request to an upper-level lock manager, or return a lock corresponding to the lock request to the service execution node;

the local lock manager is configured to: receive a lock request sent by a lower-level lock manager of the local lock manager, and according to a state of whether a lock is held, continue to send the lock request to an upper-level lock manager of the local lock manager, or return a lock corresponding to the lock request to the lower-level lock manager of the local lock manager; and the global lock manager is configured to: receive a lock request sent by a lower-level lock manager of the global lock manager, and return a lock corresponding to the lock request to the lower-level lock manager of the global lock manager.

With reference to the fourth aspect, in a first possible implementation manner, when the node lock manager holds the lock corresponding to the lock request, the node lock manager is specifically configured to return the lock corresponding to the lock request to the service execution node; and when the node lock manager does not hold the lock corresponding to the lock request, the node lock manager is specifically configured to send the lock request to the upper-level lock manager of the node lock manager.

With reference to the fourth aspect, in a second possible implementation manner, when the local lock manager holds the lock corresponding to the lock request, the local lock manager is configured to return the lock corresponding to the lock request to the lower-level lock manager of the local lock manager; and when the local lock manager does not hold the lock corresponding to the lock request, the local lock manager is configured to send the lock request to the upper-level lock manager of the local lock manager.

With reference to the fourth aspect, the first possible implementation manner, or the second possible implementation manner, in a third possible implementation manner, the lock manager is further configured to:

combine a preset number of lock requests that need to be sent to the upper-level lock manager into a same lock request, and send the same lock request to the upper-level lock manager of the lock manager.

With reference to the fourth aspect, the first possible implementation manner, or the second possible implementation manner, in a fourth possible implementation manner, the lock manager is further configured to:

when the lock corresponding to the lock request is being returned, set a maximum holding time of the lock corresponding to the lock request, and when a time of holding the lock, which is corresponding to the lock request, by the lower-level lock manager of the lock manager is greater than or equal to the maximum holding time, the lock manager sends a forced invalidation request to the lower-level lock manager of the lock manager, so that after receiving the forced invalidation request, the lower-level lock manager of the lock manager releases the lock corresponding to the lock request.

In a lock management method and system, and a method and an apparatus for configuring a lock management system that are provided in embodiments of the present invention, a corresponding level of a lock management system is set for each service execution node according to the number of service execution nodes, the number of system instances on all service execution nodes, the number of handling processes on all the service execution nodes, and a delay of access of each service execution node to a central control node of a distributed system, and lock management is performed by a configured lock management system, which can reduce a lock access delay and improve system running performance.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention.

Figure 1:
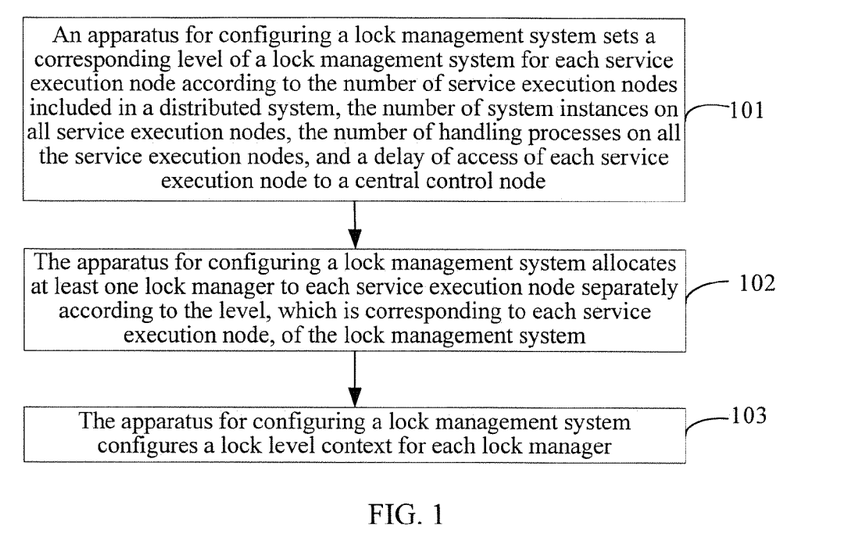
FIG. 1 is a schematic flowchart of a method for configuring a lock management system according to an embodiment of the present invention.

Embodiments of the present invention provide a lock management method and system, and a method and an apparatus for configuring a lock management system, which can configure a lock management system according to the number of handling processes, so as to manage a lock of a handling process. The present invention is applied to a distributed system, and the distributed system includes at least two service execution nodes and one central control node. Each service execution node runs a corresponding system instance by using at least one handling process, and shares and controls resources by using the central control node. Certainly, the service execution node herein may be a specific physical node, the system instance running on the service execution node may be system software or application software, and a specific operating system or application software runs with support of several handling processes on the service execution node. For example, in a data center, a service execution node is deployed in a standardized cabinet, and communication between service execution nodes in different cabinets needs to be completed by using switched lines built in the cabinets, a branch switching device, and a main switching device. A system program or an application program running in the data center is embodied in a form of a system instance, and each system instance runs by using several handling processes. Specifically, an embodiment of the present invention provides a method for configuring a lock management system in a distributed system. As shown in FIG. 1, the method includes the following steps:

101. The apparatus for configuring a lock management system sets a corresponding level of a lock management system for each service execution node according to the number of service execution nodes included in the distributed system, the number of system instances on all service execution nodes, the number of handling processes on all the service execution nodes, and a delay of access of each service execution node to a central control node.

The number of all handling processes corresponding to a system instance on each service execution node is known; therefore, after acquiring the number of handling process of a system instance, the apparatus for configuring a lock management system may acquire handling processes corresponding to all system instances according to the number of system instances. In the prior art, a level of a lock manager of each service execution node is manually configured in advance in a lock management system; therefore, when the number of handling processes changes, the level, which is corresponding to the service execution node, of the lock management system cannot be changed, and in a case in which access traffic of lock requests becomes heavy, a lock access delay is rather serious. Herein, the level, which is corresponding to the service execution node, of the lock management system is the number of lock managers corresponding to the service execution node.

According to an actual situation, for different service execution nodes, a level of a lock management system is not necessarily the same. Therefore, a level of a lock management system can only be limited to one service execution node, and handling processes on a same service execution node are corresponding to a same level of a lock management system. In this case, a proper level of a lock management system may be allocated according to the number of service execution nodes, the number of system instances, the number of handling processes, and the delay of the access of each service execution node to the central control node, so as to reduce the lock access delay.

For specific allocation of a level of a lock management system, refer to a delay difference between a lock manager at each level and an adjacent lock manager. When the delay difference is greater than a preset order of magnitude, a lock manager at one level may be added between the two lock managers.

102. The apparatus for configuring a lock management system allocates at least one lock manager to each service execution node separately according to the level, which is corresponding to each service execution node, of the lock management system.

Specifically, when the level, which is acquired in step 101, of the lock management system is one, the lock manager allocated to the service execution node is a global lock manager; that is, all handling processes on the service execution node are managed only by the global lock manager, and the service execution node requests a lock only from the global lock manager.

When the level, which is acquired in step 101, of the lock management system is two, one node lock manager and one global lock manager are allocated to the service execution node. The global lock manager does not directly manage the service execution node any longer, but directly manages the node lock manager, and the node lock manager directly manages the service execution node. The service execution node requests a lock only from the node lock manager. When the node lock manager does not have the requested lock, the node lock manager requests the lock from the global lock manager.

When the level, which is acquired in step 101, of the lock management system is greater than two, one node lock manager, one global lock manager, and at least one local lock manager between the node lock manager and the global lock manager are allocated to the service execution node (the number of local lock managers is determined according to the level of the lock management system, and specifically, the number of node lock managers is equal to a number obtained by subtracting two from the level of the lock management system). The global lock manager directly manages the local lock manager, the local lock manager directly manages the node lock manager, and the node lock manager directly manages a handling process on the service execution node.

Optionally, after step 102, the method further includes the following: When a service execution node corresponding to the global lock manager is different from a service execution node on which at least one system instance is located, a lock manager at one level is set for the service execution node corresponding to the at least one system instance, where the at least one system instance runs on a same service execution node. The process is a process of adding a lock manager to a lock management system. That is, when a new system instance is added to a new service execution node in a distributed system, or an original system instance needs to add a new handling process to run on a new service execution node, a lock manager at a new level is added to the lock management system. The added lock manager may include a newly-added node lock manager and a newly-added local lock manager, and the number of levels of local lock managers that need to be newly added may be determined according to the method in step 101.

Apparently, the foregoing global lock manager, node lock manager, and local lock management are names of lock manager, where the names are defined merely to clearly express a level relationship; therefore, in the present invention, lock management may refer to any one of a global lock manager, a node lock manager, and local lock management, where all lock managers may be implemented by using a lock manager server.

103. The apparatus for configuring a lock management system configures a lock level context for each lock manager.

Specifically, the lock level context should include the number of lock levels, a level at which a lock manager is located, an upper-level lock manager, a lower-level lock manager, and a physical node that is responsible for a lock; and may further include information such as a lock cache size, a lock hand-in time, a lock request delay, and the number of locks handled in batches.

The lock level context is used to determine an adjacent lock manager of each lock manager, and the lock level context is at least used to determine an upper-level lock manager of each lock manager.

For example, when the level of the lock management system in step 102 is greater than three, at least one local lock manager is set between the node lock manager and the global lock manager, and the lock level context determines an upper-level lock manager and a lower-level lock manager of each local lock manager, where a lower-level lock manager requests a lock from an upper-level lock manager.

Specifically, the apparatus for configuring a lock management system determines an upper-level lock manager and a lower-level lock manager of each lock manager according to information, such as the number of lock levels, a level at which a lock manager is located, an upper-level lock manager, a lower-level lock manager, and a node that is responsible for a lock, that are in the lock level context.

Setting of the level of a lock management system corresponding to each service execution node is performed according to the number of service execution nodes included in the distributed system, the number of system instances on all service execution nodes, the number of handling processes on all the service execution nodes, and the delay of the access of each service execution node to the central control node. In an actual data access process, a delay exists in a lock access handling process. A lock access delay time of each service execution node is determined by the number of handling processes included in all system instances on the service execution node and a level, which is corresponding to the service execution node, of the lock management system. That the service execution node includes one system instance is used as an example. If the system instance includes N handling processes, and the service execution node requests a lock directly from a global lock manager, a delay of acquiring the lock by a handling process from the global lock manager is t; however, when a node lock manager is set on the service execution node, that is, when the level, which is corresponding to the service execution node, of the lock management system is two, a delay of acquiring the lock by the handling process from the node lock manager is 0.1 t. When N handling processes request a same lock at the same time, a percentage of a delay overhead reduction is (90−100/N) %. When N is 10, in an ideal situation, setting of a node lock manager may decrease a delay of a lock access handling process by 80%. The foregoing instance is merely an implementable solution. Certainly, with reference to an actual situation, the number of handling processes and an effect of a delay extent reduction may be different; however, setting of another lock manager except a global lock manager for a service execution node can indeed reduce a lock request handling delay. Therefore, when a level, which is corresponding to a service execution node, of a lock management system is set, the number of all service execution nodes in a distributed system, the number of system instances on all service execution nodes, and the number of handling processes on all the service execution nodes may be comprehensively calculated, a model of the lock management system may be constructed according to these data. A model in which lock access handling delays of all service execution nodes are within a preset range is acquired by calculating a delay of lock requested by each service execution node, that is, a lock access handling process delay on each service execution node in the model of the lock management system is the lowest or is lower than a given delay threshold. Therefore, when a delay of access of a service execution node to the central control node is relatively high, setting of lock managers at a specific number of levels for a corresponding service execution node may accordingly reduce a lock access delay of the service execution node.

A lock configuration file of the foregoing lock management system may be implemented in a general file configure (configuration) manner, and may also be implemented in an XML manner. An example of an XML configuration file is provided herein:

```
<?xml version="1.0"?>{A file is an xml file}
<LOCK MANAGER>{A lock management system}
<LEVEL> 0 </LEVEL> {A level of a lock manager is 0}
<IPADDRESS>10.0.1.3</ IPADDRESS >{An IP address of a service
execution node corresponding to a lock manager is 10.0.13}
<PORT>6699</PORT>{An access port for providing a service by
a lock manager is 6699}
<CAPACITY>200MB</CAPACITY>{A system capacity is 200MB}
<UPPERLEVEL>none</UPPERLEVEL>{An upper level is "none"}
<LOWERLEVEL>none</LOWERLEVEL>{A lower level is "none"}
<NODES>10.0.1.5$10.0.1.6</NODES>{A service execution phase
of a service execution node}
<BATCHNUMBER>30</BATCHNUMBER>{The number of batch handling is
30, and a batch of lock requests are sent to an upper-level lock manager
when the number of lock requests reaches 30}
<BATCHTIMEOUT>30ms</BATCHTIMEOUT>{Batch invalidation time
is 30ms}
<LOCKINVALIDTIMEOUT>50ms</LOCKINVALIDTIMEOUT>{An
invalidation time of an exclusive lock}
</LOCK MANAGER>
```

In a method for configuring a lock management system according to an embodiment of the present invention, a corresponding level of a lock management system is set for each service execution node according to the number of service execution nodes, the number of system instances on all service execution nodes, the number of handling processes on all the service execution nodes, and a delay of access of each service execution node to a central control node of the distributed system, and lock management is performed by a configured lock placing management system, which can reduce a lock access delay and improve system running performance.

Figure 2:
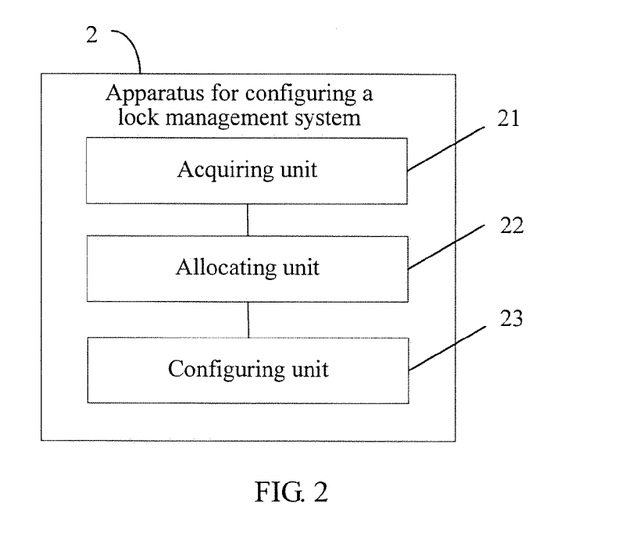
FIG. 2 is a schematic structural diagram of an apparatus for configuring a lock management system according to an embodiment of the present invention.

An embodiment of the present invention further provides an apparatus 2 for configuring a lock management system, and the apparatus 2 is configured to implement the method, which is provided in the foregoing method embodiment, for configuring a lock management system and is applied to a distributed system, where the distributed system includes at least two service execution nodes and one central control node. Each service execution node runs a corresponding system instance by using at least one handling process, and shares and controls resources by using the central control node. Specifically, as shown in FIG. 2, the apparatus 2 includes an acquiring unit 21, an allocating unit 22, and a configuring unit 23.

The acquiring unit 21 is configured to set a corresponding level of a lock management system for each service execution node according to the number of service execution nodes included in the distributed system, the number of system instances on all service execution nodes, the number of handling processes on all the service execution nodes, and a delay of access of each service execution node to the central control node of the distributed system;

the allocating unit 22 is configured to allocate at least one lock manager to each service execution node separately according to the level, which is acquired by the acquiring unit 21 and is corresponding to each service execution node, of the lock management system; and the configuring unit 23 is configured to configure a lock level context for each lock manager allocated by the allocating unit 22, where the lock level context is used to determine an adjacent lock manager of each lock manager.

Specifically, when a lock management system set for a service execution node has two levels, the allocating unit 22 is specifically configured to allocate one node lock manager and one global lock manager to the service execution node, where an upper-level lock manager of the node lock manager is the global lock manager;

or, when a level, which is set for a service execution node, of a lock management system is greater than two, the allocating unit 22 is specifically configured to: allocate one node lock manager, one global lock manager, and at least one local lock manager that is set between the node lock manager and the global lock manager to the service execution node, and determine an upper-level lock manager and a lower-level lock manager of each local lock manager according to the lock level context, where a lower-level lock manager requests a lock from an upper-level lock manager.

Optionally, the allocating unit 22 is further configured to: when a service execution node corresponding to the global lock manager is different from a service execution node on which at least one system instance is located, set a lock manager at one level for the service execution node corresponding to the at least one system instance.

The lock management context includes: the number of lock levels, a level at which a lock manager is located, an upper-level lock manager, a lower-level lock manager, and a node that is responsible for a lock.

In an apparatus for configuring a lock management system according to an embodiment of the present invention, a corresponding level of a lock management system is set for each service execution node according to the number of service execution nodes, the number of system instances on all service execution nodes, the number of handling processes on all the service execution nodes, and a delay of access of each service execution node to a central control node of the distributed system, and lock management is performed by a configured lock placing management system, which can reduce a lock access delay and improve system running performance.

Figure 3:
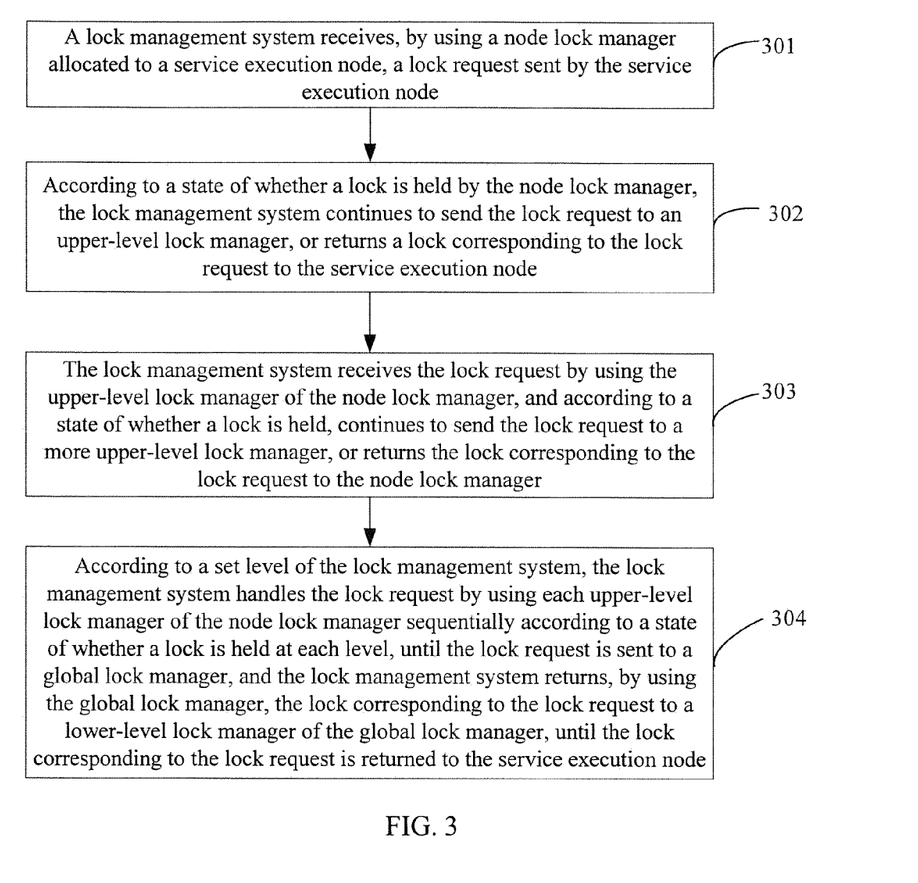
FIG. 3 is a schematic flowchart of a lock management method according to another embodiment of the present invention.

An embodiment of the present invention further provides a lock management method, and the method is applied to a lock management system configured in the foregoing embodiment of the method for configuring a lock management system. Specifically, as shown in FIG. 3, the method includes the following steps:

301. The lock management system receives, by using a node lock manager allocated to a service execution node, a lock request sent by the service execution node.

When a handling process needs to access data of a distributed system, a lock needs to be used as permission for the handling process to access the data of the distributed system. In this case, the handling process first searches itself to determine whether a lock is held. When the handling process does not hold a lock, the handling process sends a lock request to a lock manager of the handling process on the service execution node, and the lock request includes information, such as a type, about a lock required by the handling process.

302. According to a state of whether a lock is held by the node lock manager, the lock management system continues to send the lock request to an upper-level lock manager, or returns a lock corresponding to the lock request to the service execution node.

After receiving the lock request sent by the handling process, the node lock manager searches itself to determine whether the lock corresponding to the lock request is held. When the node lock manager does not hold the lock corresponding to the lock request, the node lock manager sends the lock request to an upper-level lock manager of the node lock manager; when the node lock manager holds the lock corresponding to the lock request (the lock manager itself does not hold the lock, the lock is held by a handling process, and the lock manager may manage multiple handling processes; when a handling process holds the lock, "that the node lock manager holds the lock corresponding to the lock request" herein refers to that the lock manager has information that the handling process holds the lock, that is, registration information of the lock manager indicates that the lock corresponding to the lock request registers), detection is performed. When the lock corresponding to the lock request is a shared lock, the node lock manager directly returns the lock corresponding to the lock request to the service execution node; when the lock corresponding to the lock request is an exclusive lock, the node lock manager needs to wait until the handling process that holds the lock corresponding to the lock request releases the lock corresponding to the lock request, and after the handling process releases the lock corresponding to the lock request, the node lock manager returns the lock corresponding to the lock request to the service execution node. In a same lock mode, a lock request is performed directly in the foregoing manner. When a lock held by a node lock manager and a request lock are in different lock modes, it is required to determine compatibility of lock modes, and according to the compatibility of the lock modes, a lock holding status is determined, and a corresponding lock is returned. Table 1 provides an example of a lock mode compatibility matrix in the prior art, where X indicates that two lock modes are incompatible, ACCESS SHARE indicates shared access, ROW SHARE indicates row sharing, ROW EXCLUSIVE indicates row exclusion, SHARE ROW EXCLUSIVE indicates exclusion of a shared row, EXCLUSIVE indicates exclusion, and ACCESS EXCLUSIVE indicates exclusive access. Referring to Table 1, a lock mode ACCESS SHARE is compatible with lock modes ACCESS SHARE, ROW SHARE, ROW EXCLUSIVE, SHARE ROW EXCLUSIVE, and EXCLUSIVE, and the lock mode ACCESS SHARE and a lock mode ACCESS EXCLUSIVE are mutually exclusive.

TABLE 1

| Mode of a requested lock | Mode of a held lock | | | | | |
| --- | --- | --- | --- | --- | --- | --- |
| | ACCESS SHARE | ROW SHARE | ROW EXCLUSIVE | SHARE ROW EXCLUSIVE | EXCLUSIVE | ACCESS EXCLUSIVE |
| ACCESS SHARE | | | | | | X |
| ROW SHARE | | | | | X | X |
| ROW EXCLUSIVE | | | | X | X | X |
| SHARE ROW EXCLUSIVE | | | X | X | X | X |
| EXCLUSIVE | | X | X | X | X | X |
| ACCESS EXCLUSIVE | X | X | X | X | X | X |

Optionally, each lock manager may keep one lock request handling window, which is used to combine a preset number of lock requests that need to be sent to an upper-level lock manager into a same lock request and send the same lock request to the upper-level lock manager of the lock manager. In this way, the upper-level lock manager can acquire all lock requests once.

303. The lock management system receives the lock request by using the upper-level lock manager of the node lock manager, and according to a state of whether a lock is held, continues to send the lock request to a more upper-level lock manager, or returns the lock corresponding to the lock request to the node lock manager.

304. According to a set level of the lock management system, the lock management system handles the lock request by using each upper-level lock manager of the node lock manager sequentially according to a state of whether a lock is held at each level, until the lock request is sent to a global lock manager, and the lock management system returns, by using the global lock manager, the lock corresponding to the lock request to a lower-level lock manager of the global lock manager, until the lock corresponding to the lock request is returned to the service execution node.

When a lock manager at any level receives a lock request sent by a lower-level lock manager of the lock manager, the lock manager searches itself to determine whether a lock corresponding to the lock request is held. When the lock manager holds the lock corresponding to the lock request, the lock manager returns the lock corresponding to the lock request to the lower-level lock manager; when the lock manager does not hold the lock corresponding to the lock request, the lock manager sends the lock request to an upper-level lock manager of the lock manager. A global lock manager holds all locks; therefore, when the global lock manager receives a lock request sent by a lower-level lock manager of the global lock manager, a lock corresponding to the lock request can be certainly returned.

Optionally, for an exclusive lock, only when a handling process that holds the lock releases the exclusive lock, another handling process on the service execution node can acquire the exclusive lock. To reduce a delay caused by a fact that the exclusive lock is held by a handling process on the service execution node and is not in use, when returning the lock corresponding to the lock request, a lock manager sets a maximum holding time of the lock corresponding to the lock request. When a time of holding the lock, which is corresponding to the lock request, by the lower-level lock manager of the lock manager is greater than or equal to the maximum holding time, the lock manager sends a forced invalidation request to the lower-level lock manager of the lock manager, so that after receiving the forced invalidation request, the lower-level lock manager of the lock manager releases the lock corresponding to the lock request. In this way, the delay caused by the fact that the exclusive lock is held by the handling process and is not in use may be reduced.

In a lock management method provided in an embodiment of the present invention, a level of a lock management system is configured in advance according to a system instance and a handling process, which can reduce a lock access delay and improve system running performance. Further, in the method, multiple lock requests can be combined into one lock request, and a maximum holding time of an exclusive lock is set, which improves a handling speed and handling efficiency of the lock request.

Figure 4:
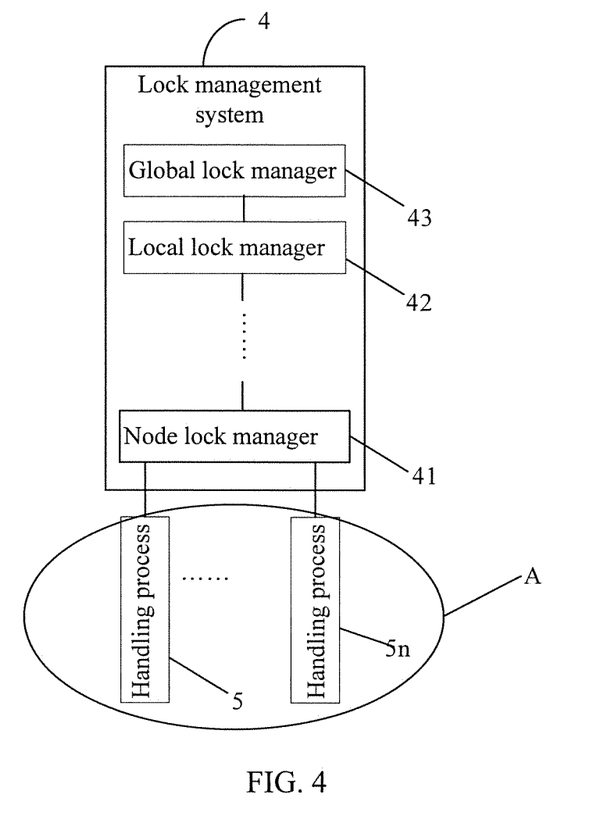
FIG. 4 is a schematic structural diagram of a lock management system according to another embodiment of the present invention.

An embodiment of the present invention further provides a lock management system 4, which uses the lock management method provided in the foregoing method embodiment. As shown in FIG. 4, the lock management system 4 includes at least one node lock manager 41, a local lock manager 42, and one global lock manager 43, where the number of lock managers set for each service execution node is corresponding to the number of levels of the lock management system, where:

there may be one or more lower-level lock managers that are directly managed by the global lock manager, and a lower-level lock manager directly managed by the global lock manager may be a local lock manager or a node lock manager, and may also be a service execution node. Likewise, there may be one or more lower-level lock managers of the local lock manager, and a lower-level lock manager of the local lock manager may be a local lock manager, and may also be a node lock manager.

The node lock manager 41 is configured to: receive a lock request sent by a handling process 51 by using a service execution node A, and according to a state of whether a lock is held, continue to send the lock request to an upper-level lock manager, or return a lock corresponding to the lock request to the service execution node A.

Specifically, when the node lock manager 41 holds the lock corresponding to the lock request, the node lock manager 41 is specifically configured to return the lock corresponding to the lock request to the service execution node A.

When the node lock manager 41 does not hold the lock corresponding to the lock request, the node lock manager 41 is specifically configured to send the lock request to the upper-level lock manager of the node lock manager 41.

The local lock manager 42 is configured to: receive a lock request sent by a lower-level lock manager of the local lock manager 42, and according to a state of whether a lock is held, continue to send the lock request to an upper-level lock manager of the local lock manager 42, or return a lock corresponding to the lock request to the lower-level lock manager of the local lock manager 42.

Specifically, when the local lock manager 42 holds the lock corresponding to the lock request, the local lock manager 42 is configured to return the lock corresponding to the lock request to the lower-level lock manager of the local lock manager 42.

When the local lock manager 42 does not hold the lock corresponding to the lock request, the local lock manager 42 is configured to send the lock request to the upper-level lock manager of the local lock manager 42.

The global lock manager 43 is configured to: receive a lock request sent by a lower-level lock manager of the global lock manager 43, and return a lock corresponding to the lock request to the lower-level lock manager of the global lock manager 43.

Optionally, a preset number of lock requests that need to be sent to the upper-level lock manager are combined into a same lock request, and the same lock request is sent to the upper-level lock manager of the lock manager.

Further, optionally, the lock manager is further configured to: when the lock corresponding to the lock request is being returned, set a maximum holding time of the lock corresponding to the lock request, and when a time of holding the lock, which is corresponding to the lock request, by the lower-level lock manager of the lock manager is greater than or equal to the maximum holding time, the lock manager sends a forced invalidation request to the lower-level lock manager of the lock manager, so that after receiving the forced invalidation request, the lower-level lock manager of the lock manager releases the lock corresponding to the lock request.

In a lock management system provided in an embodiment of the present invention, a level of a lock management system is configured in advance according to a system instance and a handling process, which can reduce a lock access delay and improve system running performance. Further, in this embodiment, multiple lock requests can be combined into one lock request, and a maximum holding time of an exclusive lock is set, which improves a handling speed and handling efficiency of the lock request.

Figure 5:
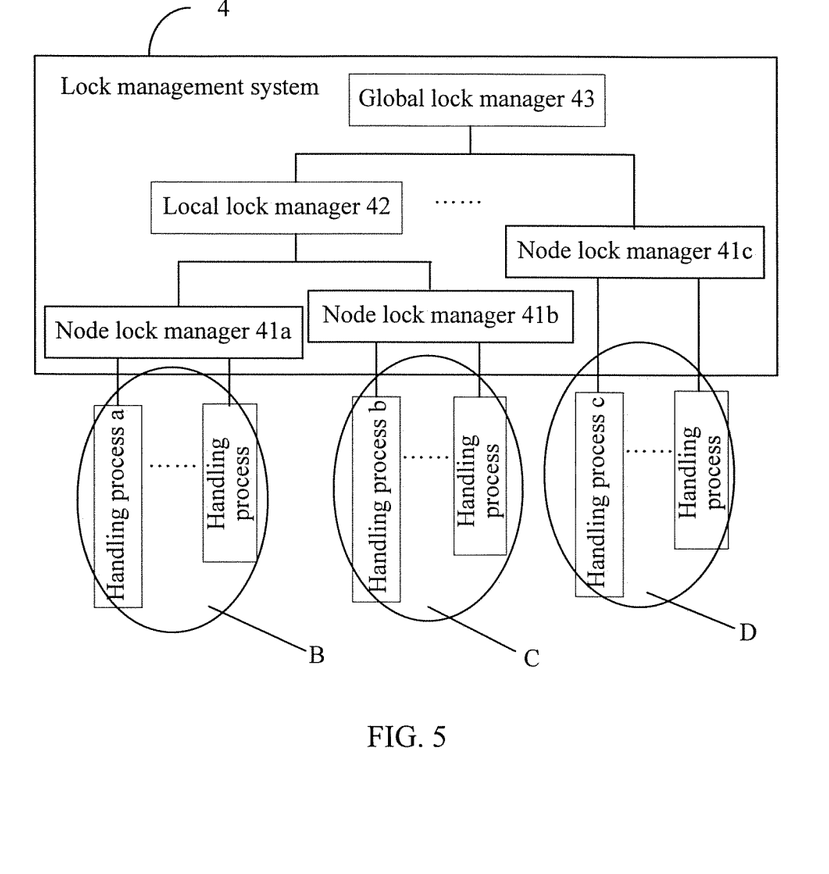
FIG. 5 is a schematic structural diagram of another lock management system according to another embodiment of the present invention.

As shown in FIG. 5, a lock management system manages lock requests of service execution nodes B, C, and D. That a handling process a of the service execution node B sends a lock request for an exclusive lock or a lock request for a shared lock is used as an example for description (an exclusive lock refers to a lock that can be held by only one handling process, and a shared lock refers to a lock that can be held by multiple handling processes). A level of the lock management system is three; that is, for the service execution node B, the lock management system has one node lock manager 41a, an upper-level lock manager of the node lock manager 41a is a local lock manager 42, and an upper-level lock manager of the local lock manager 42 is a global lock manager 43. The figure also shows a node lock manager 41b of the service execution node C and a node lock manager 41c of the service execution node D.

First, request for a shared lock is used as an example. The handling process a sends the lock request for the shared lock to the node lock manager 41a by using the service execution node B, and the node lock manager 41a searches itself to determine whether the shared lock is held. If it is found by searching that the shared lock is held, the shared lock is directly returned; if the node lock manager 41a does not hold the shared lock, but holds an exclusive lock, the request for the shared lock enters a waiting queue, and after the exclusive lock is released, the lock request for the shared lock is sent to the upper-level lock manager, that is, the local lock manager 42; and if the node lock manager 41a does not hold an exclusive lock either, the lock request for the shared lock is directly sent to the upper-level lock manager, that is, the local lock manager 42. In this case, the node lock manager 41a may keep a lock request handling window, multiple requests for shared locks within a time segment are combined into a same lock request, and the same lock request is sent to the local lock manager 42.

The local lock manager 42 searches itself to determine whether the shared lock is held. If it is found by searching that the shared lock is held, the shared lock is directly returned; if the local lock manager 42 does not hold the shared lock, but holds an exclusive lock, the request for the shared lock enters a waiting queue, and after the exclusive lock is released, the lock request for the shared lock is sent to the upper-level lock manager, that is, the global lock manager 43; and if the local lock manager 42 does not hold an exclusive lock either, the lock request for the shared lock is directly sent to the upper-level lock manager, that is, the global lock manager 43. In this case, the local lock manager 42 may keep a lock request handling window, multiple requests for shared locks within a time segment are combined into a same lock request, and the same lock request is sent to the global lock manager 43.

The global lock manager 43 searches itself to determine whether an exclusive lock is held. If it is found by searching that an exclusive lock is held, the request for the shared lock enters a waiting queue, and after the exclusive lock is released, the shared lock is returned to the local lock manager 42; if the global lock manager 43 does not hold an exclusive lock, the shared lock is directly returned to the local lock manager 42. The local lock manager 42 returns the shared lock to the node lock manager 41a, and the node lock manager 41a returns the shared lock to the service execution node B.

A request for an exclusive lock is used as an example. The handling process a sends the lock request for the exclusive lock to the node lock manager 41a by using the service execution node B, and the node lock manager 41a searches itself to determine whether the exclusive lock is held. If the node lock manager 41a holds the exclusive lock, and no other handling process holds the exclusive lock, the exclusive lock is directly returned; if the node lock manager 41a holds the exclusive lock, and another handling process, that is, a handling process b also holds the exclusive lock, release of the exclusive lock held by the handling process b is waited, and after the release, the exclusive lock is returned to the handling process a; and if the node lock manager 41a holds a shared lock, the lock request for the exclusive lock enters a waiting queue, and after the shared lock is released, the lock request for the exclusive lock is sent to the upper-level lock manager, that is, the local lock manager 42.

The local lock manager 42 searches itself to determine whether the exclusive lock is held. If the local lock manager 42 holds the exclusive lock, and no other handling process holds the exclusive lock, the exclusive lock is directly returned; if the local lock manager 42 holds the exclusive lock, and another handling process, that the handling process b also holds the exclusive lock, release of the exclusive lock held by the handling process b is waited, and after the release, the exclusive lock is returned to the handling process a; and if the local lock manager 42 holds a shared lock, the lock request for the exclusive lock enters a waiting queue, and after the shared lock is released, the lock request for the exclusive lock is sent to the upper-level lock manager, that is, the global lock manager 43. Certainly, the present invention provides a forced invalidation mechanism; therefore, optionally, if the local lock manager 42 holds the exclusive lock, and another handling process, that is, the handling process b also holds the exclusive lock, the local lock manager 42 may send a forced invalidation request to the node lock manager 41b corresponding to the service execution node C; in this case, after the exclusive lock held by the handling process b is released, the exclusive lock is returned. Similarly, if the local lock manager 42 holds a shared lock, and when the shared lock is allocated to the handling process b of the node lock manager 41b for use, the local lock manager 42 may send a forced invalidation request to the node lock manager 41b corresponding to the service execution node C; and after the shared lock is released, the lock request for the exclusive lock is sent to the upper-level lock manager, that is, the global lock manager 43. Certainly, in this case, the local lock manager 42 may keep a lock request handling window, multiple requests for exclusive locks within a time segment are combined into a same lock request, and the same lock request is sent to the global lock manager 43.

The global lock manager 43 searches itself to determine whether the exclusive lock is held. If the global lock manager 43 holds the exclusive lock, and no other handling process holds the exclusive lock, the exclusive lock is directly returned; if the node lock manager 41c also holds the exclusive lock, and the exclusive lock is used in a handling process c of the service execution node D, release of the exclusive lock held by the node lock manager 41c is waited, and after the release, the exclusive lock is returned; if the global lock manager 43 holds a shared lock, the lock request for the exclusive lock enters a waiting queue, and after the shared lock is released, the exclusive lock is returned to the local lock manager 42. The local lock manager 42 returns the exclusive lock to the node lock manager 41a, and the node lock manager 41a returns the exclusive lock to the service execution node B. Certainly, the present invention provides a forced invalidation mechanism; therefore, in a lock request handling process of the global lock manager 43, if the node lock manager 41c also holds the exclusive lock, the global lock manager 43 may send a forced invalidation request to the node lock manager 41c corresponding to the service execution node D; in this case, after the exclusive lock held by the handling process c is released, the exclusive lock is returned. Similarly, if the global lock manager 43 holds a shared lock, and when the shared lock is allocated to the handling process c of the node lock manager 41c for use, the global lock manager 43 may send a forced invalidation request to the node lock manager 41c corresponding to the service execution node D; and after the shared lock is released, the requested exclusive lock is returned.

It may be understood that a service execution node corresponding to each node lock manager runs at least one system instance by using a handling process; therefore, a lock request in a running process of each handling process and system instance can be requested by using a corresponding node lock manager. A specific requesting method is not described herein again. In this way, a handling process can rapidly acquire a lock that is needed, which saves time of a lock management system and reduces a lock access delay of the system.

Figure 6:
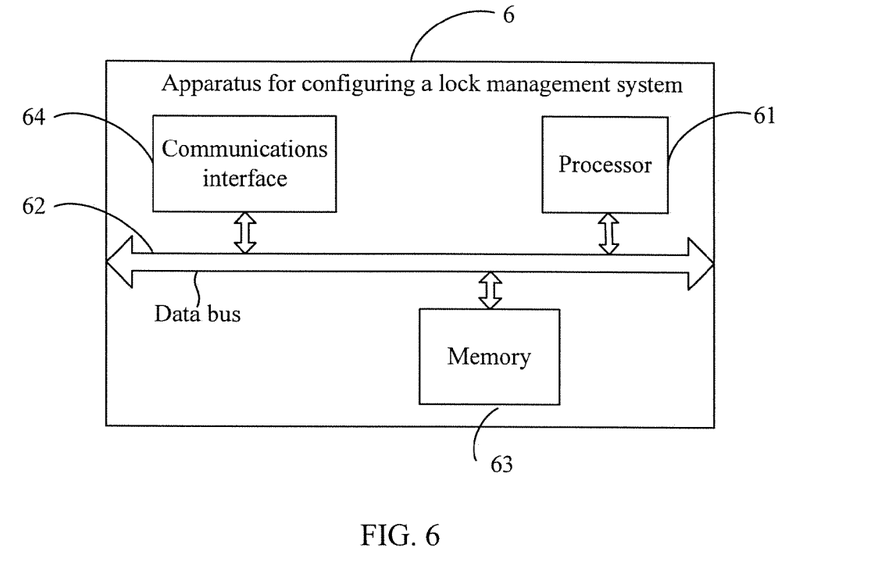
FIG. 6 is a schematic structural diagram of an apparatus for configuring a lock management system according to still another embodiment of the present invention.

An embodiment of the present invention further provides an apparatus 6 for configuring a lock management system. As shown in FIG. 6, the apparatus 6 for configuring a lock management system includes at least one processor 61, a data bus 62, a memory 63, and a communications port 64. The at least one processor 61, the memory 63, and the communications port 64 are connected and communicate with each other by using the data bus 62, where:

the data bus 62 may be an industry standard architecture (Industry Standard Architecture, ISA) bus, a peripheral component interconnect (PCI) bus, an extended industry standard architecture (Extended Industry Standard Architecture, EISA) bus, or the like. The data bus 62 may be classified into an address bus, a data bus, a control bus, and the like. For ease of illustration, only one bold line is used in FIG. 6 to represent the bus, which, however, does not mean that there is only one bus or only one type of bus.

The memory 63 is configured to store executable program code and corresponding data, where the program code includes a computer operation instruction. The memory 63 may include a high-speed RAM memory, and may further include a non-volatile memory.

The processor 61 may be a central processing unit CPU, or an application specific integrated circuit ASIC, or one or more integrated circuits configured to implement this embodiment of the present invention.

The communications port 64 is configured to implement data exchange between the apparatus 6 for configuring a lock management system and the outside.

The processor 61 is further configured to invoke the program code in the memory 63 to perform operations of the acquiring unit 21, the allocating unit 22, and the configuring unit 23 in the foregoing apparatus embodiment. For a specific description, refer to the apparatus embodiment corresponding to FIG. 2. Details are not described herein again.

In an apparatus for configuring a lock management system according to an embodiment of the present invention, a corresponding level of a lock management system is set for each service execution node according to the number of service execution nodes, the number of system instances on all service execution nodes, the number of handling processes on all the service execution nodes, and a delay of access of each service execution node to a central control node of the distributed system, and lock management is performed by a configured lock placing management system, which can reduce a lock access delay and improve system running performance.

Figure 7:
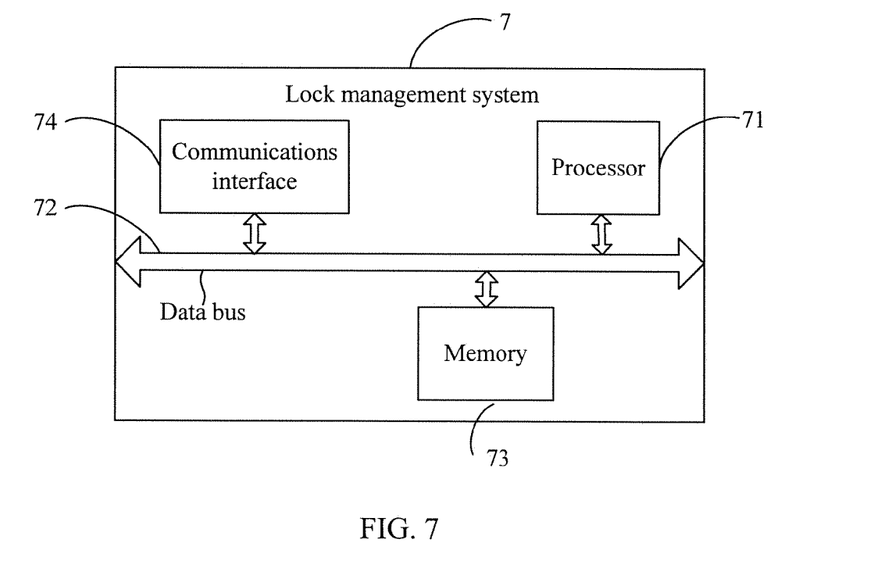
FIG. 7 is a schematic structural diagram of a lock management system according to still another embodiment of the present invention.

An embodiment of the present invention further provides a lock management system 7. As shown in FIG. 7, the lock management system 7 includes at least one processor 71, a data bus 72, a memory 73, and a communications port 74. The at least one processor 71, the memory 73, and the communications port 74 are connected and communicate with each other by using the data bus 72, where:

the data bus 72 may be an industry standard architecture (Industry Standard Architecture, ISA) bus, a peripheral component interconnect (PCI) bus, an extended industry standard architecture (Extended Industry Standard Architecture, EISA) bus, or the like. The data bus 72 may be classified into an address bus, a data bus, a control bus, and the like. For ease of illustration, only one bold line is used in FIG. 7 to represent the bus, which, however, does not mean that there is only one bus or only one type of bus.

The memory 73 is configured to store executable program code and corresponding data, where the program code includes a computer operation instruction. The memory 73 may include a high-speed RAM memory, and may further include a non-volatile memory.

The processor 71 may be a central processing unit CPU, or an application specific integrated circuit ASIC, or one or more integrated circuits configured to implement this embodiment of the present invention.

The communications port 74 is configured to implement data exchange between the lock management system 7 and the outside.

The processor 71 is further configured to invoke the program code in the memory 73 to perform operations of the at least node lock manager 41, the local lock manager 42, and the global lock manager 43 in the foregoing apparatus embodiment. For a specific description, refer to the apparatus embodiment corresponding to FIG. 4. Details are not described herein again.

In the lock management system 7, a level of the lock management system is configured in advance according to a system instance and a handling process, which can reduce a wastage rate of resources of the lock management system. Further, in the method, multiple lock requests can be combined into one lock request, and a maximum holding time of an exclusive lock is set, which improves a handling speed and handling efficiency of the lock request.

In a lock management method and system provided in embodiments of the present invention, a level of a lock management system is configured according to a system instance and a handling process, which can reduce a lock access delay and improve system running performance. Further, in the method, multiple lock requests can be combined into one lock request, and a maximum holding time of an exclusive lock is set, which improves a handling speed and handling efficiency of the lock request.

The embodiments of the present invention are specifically applied to a distributed database system. A database system in a cloud computing and virtual computing environment is used as an example. The database system needs to provide a large number of users with a database handling capability that is provided according to a requirement. A requirement on a loading handling capability is high, and the number of service execution nodes is relatively large.

When a handling process of each system instance on a service execution node needs to access data in a database, a lock needs to be used as a permission for the handling process to access data of a distributed system. Specifically, a lock request may be handled by using the lock management system in the present invention. For lock management of the foregoing service execution node, a lock management module in the database system is used to configure a lock management system, and the lock management module may be the apparatus for configuring a lock management system in the foregoing embodiment of the present invention. For a method for handling a lock request by the lock management system and a method for configuring a lock management system by the lock management module, refer to the detailed descriptions in the foregoing method and apparatus embodiments. Details are not described herein again.

According to descriptions of the foregoing implementation manners, a person skilled in the art can clearly understand that the present invention may be implemented by hardware, firmware, or a combination of the two. When the present invention is implemented by software, the functions may be stored in a computer-readable medium or may be transmitted as one or more instructions or code on the computer-readable medium. The computer-readable medium includes a computer storage medium and a communications medium, where the communications medium includes any medium that facilitates transfer of computer programs from one place to another. The storage medium may be any available medium that is accessible by a computer. For example, but it is not limited to that, the computer readable medium may include a RAM, a ROM, an EEPROM, a CD-ROM or other optical disc storage or magnetic disk storage medium or other magnetic storage device, or any other medium that can be configured to carry or store expected program code in a structural form of an instruction or data and can be accessed by a computer. Moreover, any connection may be the computer readable medium properly. For example, if software is transmitted from a website, a server or another remote source by using a coaxial cable, an optical cable, a twisted pair, or a digital subscriber line (DSL), or by using a radio technology such as infrared transmission, radio transmission and microwave transmission, then the coaxial cable, or optical cable, or twisted pair, or DSL, or the radio technology such as infrared transmission, radio transmission and microwave transmission, is included in a fixation of the medium. A disk (disk) and a disc (disc) used in the present invention include a compact disc (CD), a laser disc, an optical disc, a digital versatile disc (DVD), a floppy disk, and a blue light disc, where the disk generally copies data magnetically, and the disc copies data optically by using laser. Combinations of them shall also fall within the protection scope of the computer-readable medium.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for configuring a lock management system in a distributed system, the method comprising:

setting a corresponding level of a lock management system for each service execution node according to the number of service execution nodes comprised in the distributed system, a number of system instances on all service execution nodes, a number of handling processes on all the service execution nodes, and a delay of access of each service execution node to a central control node of the distributed system;

allocating at least one lock manager to each service execution node separately according to the level, which corresponds to each service execution node, of the lock management system; and configuring a lock level context for each lock manager, wherein the lock level context is for determining an adjacent lock manager of each lock manager.

2. The method according to claim 1, wherein allocating at least one lock manager to each service execution node separately according to the level, which corresponds to each service execution node, of the lock management system comprises:

when a lock management system set for a service execution node has two levels, allocating one node lock manager and one global lock manager to the service execution node, wherein an upper-level lock manager of the node lock manager is the global lock manager; and when the level, which is set for the service execution node, of the lock management system is greater than two, allocating one node lock manager, one global lock manager, and at least one local lock manager between the node lock manager and the global lock manager to the service execution node, and determining an upper-level lock manager and a lower-level lock manager of each local lock manager according to the lock level context, wherein a lower-level lock manager requests a lock from an upper-level lock manager.

3. The method according to claim 2, wherein after allocating at least one lock manager to each service execution node separately according to the level, which corresponds to each service execution node, of the lock management system, the method further comprises:
when a service execution node corresponding to the global lock manager is different from a service execution node on which at least one system instance is located, setting a lock manager at one level for the service execution node corresponding to the at least one system instance.

4. The method according to claim 1, wherein the lock level context comprises: the number of lock levels, a level at which a lock manager is located, an upper-level lock manager, a lower-level lock manager, and a service execution node for which a lock manager is responsible.

5. A lock management method, comprising:
receiving, using a node lock manager allocated to a service execution node, a lock request sent by the service execution node, and according to a state of whether a lock is held by the node lock manager, continuing to send the lock request to an upper-level lock manager, or returning a lock corresponding to the lock request to the service execution node;
when the lock request is sent to the upper-level lock manager, receiving the lock request using the upper-level lock manager of the node lock manager, and according to a state of whether a lock is held, continuing to send the lock request to a more upper-level lock manager, or returning the lock corresponding to the lock request to the node lock manager; and
when the lock request is sent to the more upper-level lock manager, according to a set level of a lock management system, handling the lock request using each upper-level lock manager of the node lock manager sequentially according to a state of whether a lock is held at each level, until the lock request is sent to a global lock manager, and returning, using the global lock manager, the lock corresponding to the lock request to a lower-level lock manager of the global lock manager, until the lock corresponding to the lock request is returned to the service execution node.

6. The method according to claim 5, wherein according to a state of whether a lock is held by the node lock manager, continuing to send the lock request to an upper-level lock manager, or returning a lock corresponding to the lock request to the service execution node comprises:
when the node lock manager holds the lock corresponding to the lock request, returning the lock corresponding to the lock request to the service execution node using the node lock manager; and
when the node lock manager does not hold the lock corresponding to the lock request, sending the lock request to the upper-level lock manager of the node lock manager using the node lock manager.

7. The method according to claim 5, wherein according to a state of whether a lock is held, continuing to send the lock request to a more upper-level lock manager, or returning the lock corresponding to the lock request to the node lock manager comprises:
when the upper-level lock manager of the node lock manager holds the lock corresponding to the lock request, returning the lock corresponding to the lock request to the node lock manager using the upper-level lock manager of the node lock manager; and
when the upper-level lock manager of the node lock manager does not hold the lock corresponding to the lock request, sending the lock request to the more upper-level lock manager using the upper-level lock manager of the node lock manager.

8. The method according to claim 5, further comprising:
combining, using the node lock manager, a preset number of lock requests that need to be sent to the upper-level lock manager into a same lock request, and sending the same lock request to the upper-level lock manager of the node lock manager.

9. The method according to claim 5, further comprising:
when the lock corresponding to the lock request is being returned, setting, using the lock manager, a maximum holding time of the lock corresponding to the lock request, and when a time of holding the lock, which corresponds to the lock request, by the lower-level lock manager of the lock manager is greater than or equal to the maximum holding time, sending a forced invalidation request to the lower-level lock manager of the lock manager using the lock manager, the forced invalidation request configured to cause the lower-level lock manager of the lock manager to release the lock corresponding to the lock request.

10. An apparatus for configuring a lock management system, wherein the apparatus is applied to a distributed system, the apparatus comprising:
at least one processor configured to:
set a corresponding level of a lock management system for each service execution node according to the number of service execution nodes comprised in the distributed system, a number of system instances on all service execution nodes, a number of handling processes on all the service execution nodes, and a delay of access of each service execution node to a central control node of the distributed system;
allocate at least one lock manager to each service execution node separately according to the level, which corresponds to each service execution node, of the lock management system; and
configure a lock level context for each lock manager, wherein the lock level context is for determining an adjacent lock manager of each lock manager.

11. The apparatus according to claim 10, wherein:
when a lock management system set for a service execution node has two levels, the at least one processor is configured to allocate one node lock manager and one global lock manager to the service execution node, wherein an upper-level lock manager of the node lock manager is the global lock manager; and
when a level, which is set for a service execution node, of a lock management system is greater than two, the at least one processor is configured to: allocate one node lock manager, one global lock manager, and at least one local lock manager between the node lock manager and the global lock manager to the service execution node, and determine an upper-level lock manager and a lower-level lock manager of each local lock manager according to the lock level context, wherein a lower-level lock manager requests a lock from an upper-level lock manager.

12. The apparatus according to claim 11, wherein the at least one processor is further configured to:
when a service execution node corresponding to the global lock manager is different from a service execution node on which at least one system instance is located, set a lock manager at one level for the service execution node corresponding to the at least one system instance.

13. The apparatus according to claim 10, wherein the lock level context comprises: the number of lock levels, a level at which a lock manager is located, an upper-level lock manager, a lower-level lock manager, and a service execution node for which a lock manager is responsible.

14. A lock management system, comprising:
at least one node lock manager, one local lock manager, and one global lock manager, wherein the number of lock managers set for each service execution node corresponds to a number of levels of the lock management system;
wherein the at least one node lock manager is configured to: receive a lock request sent by the service execution node, and according to a state of whether a lock is held, continue to send the lock request to an upper-level lock manager, or return a lock corresponding to the lock request to the service execution node;
wherein the local lock manager is configured to: receive a lock request sent by a lower-level lock manager of the local lock manager, and according to a state of whether a lock is held, continue to send the lock request to an upper-level lock manager of the local lock manager, or return a lock corresponding to the lock request to the lower-level lock manager of the local lock manager; and
wherein the global lock manager is configured to: receive a lock request sent by a lower-level lock manager of the global lock manager, and return a lock corresponding to the lock request to the lower-level lock manager of the global lock manager.

15. The lock management system according to claim 14, wherein:
when the node lock manager holds the lock corresponding to the lock request, the node lock manager is configured to return the lock corresponding to the lock request to the service execution node; and
when the node lock manager does not hold the lock corresponding to the lock request, the node lock manager is configured to send the lock request to the upper-level lock manager of the node lock manager.

16. The lock management system according to claim 14, wherein:
when the local lock manager holds the lock corresponding to the lock request, the local lock manager is configured to return the lock corresponding to the lock request to the lower-level lock manager of the local lock manager; and
when the local lock manager does not hold the lock corresponding to the lock request, the local lock manager is configured to send the lock request to the upper-level lock manager of the local lock manager.

17. The lock management system according to claim 14, wherein the lock manager is further configured to:
combine a preset number of lock requests that need to be sent to the upper-level lock manager into a same lock request, and send the same lock request to the upper-level lock manager of the node lock manager.

18. The lock management system according to claim 14, wherein the lock manager is further configured to:
when the lock corresponding to the lock request is being returned, set a maximum holding time of the lock corresponding to the lock request, and when a time of holding the lock, which corresponds to the lock request, by the lower-level lock manager of the lock manager is greater than or equal to the maximum holding time, send a forced invalidation request to the lower-level lock manager of the lock manager, the forced invalidation request configured to cause the lower-level lock manager of the lock manager to release the lock corresponding to the lock request.

\* \* \* \* \*